No. 805,274. PATENTED NOV. 21, 1905.
J. W. EISENHUTH.
STEERING DEVICE FOR MOTOR VEHICLES.
APPLICATION FILED MAY 25, 1905.
2 SHEETS—SHEET 1.
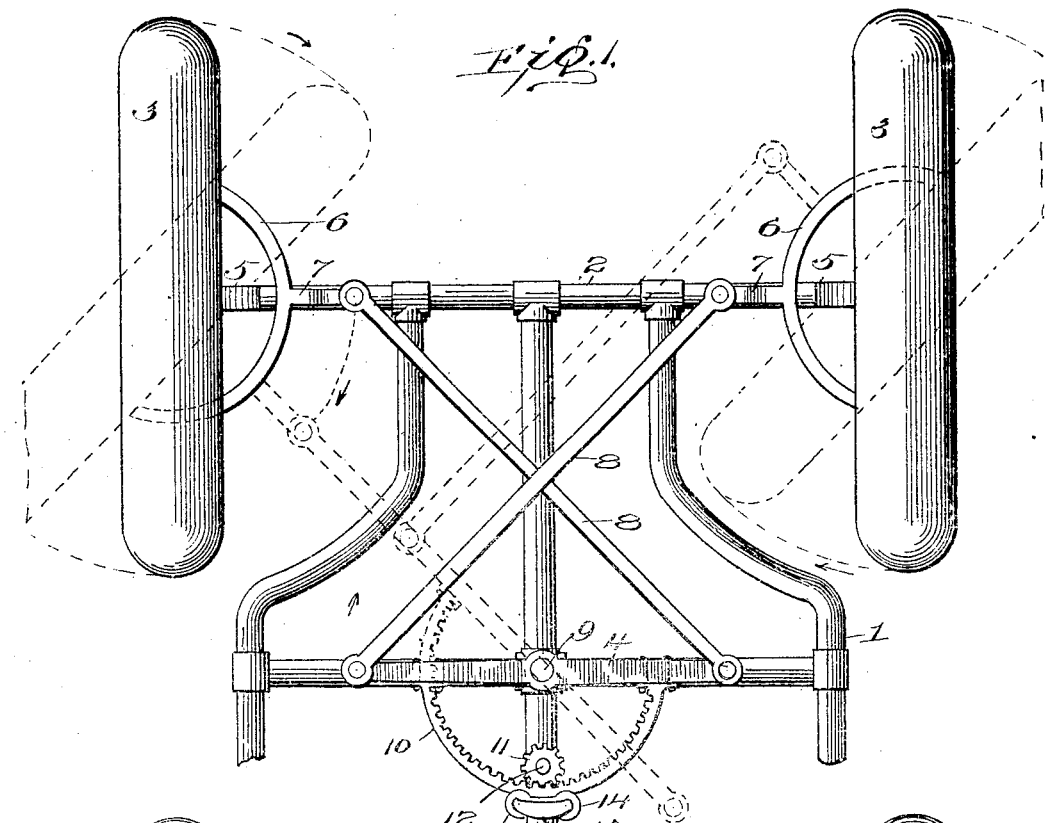
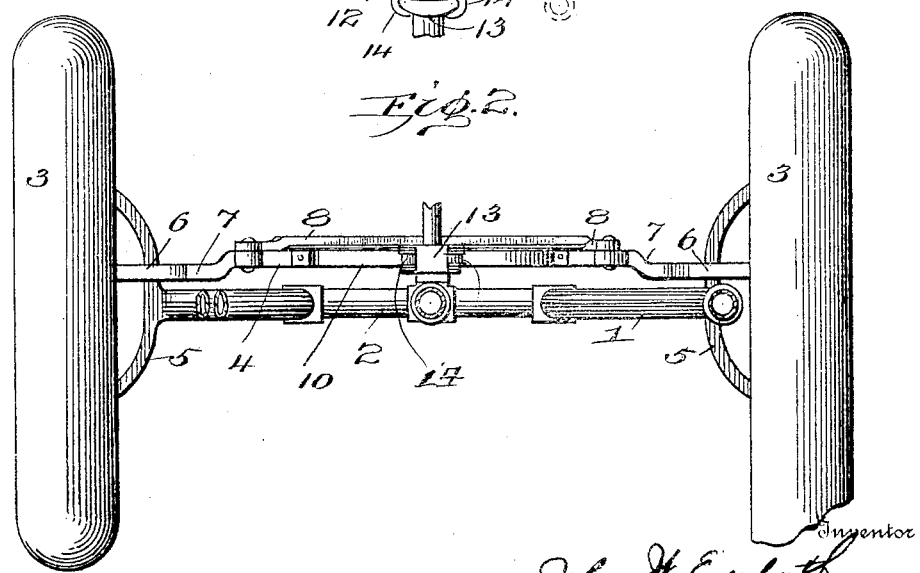
Witnesses
J. M. Fowler Jr
Jesse C. Miller
Inventor
John W. Eisenhuth
By Mason Fenwick Lawrence
Attorneys

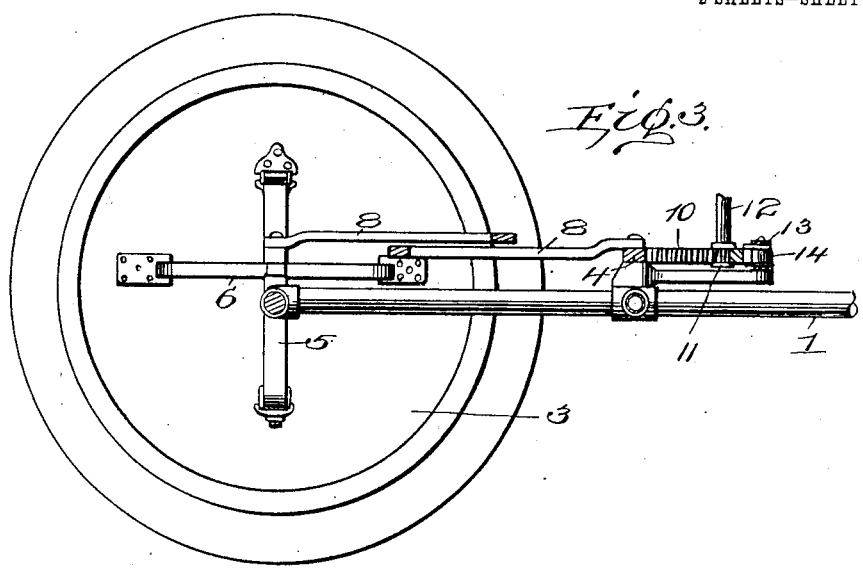
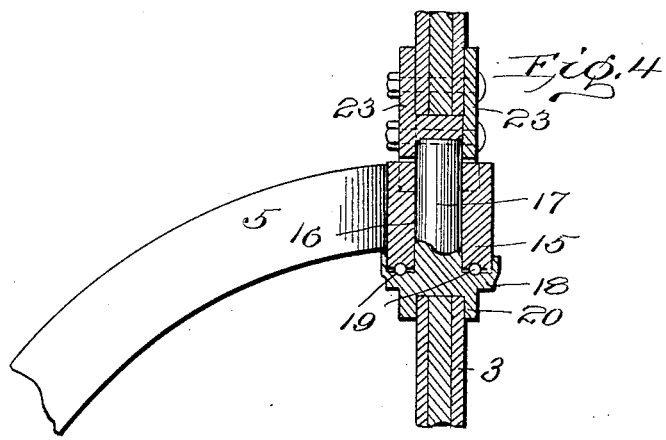
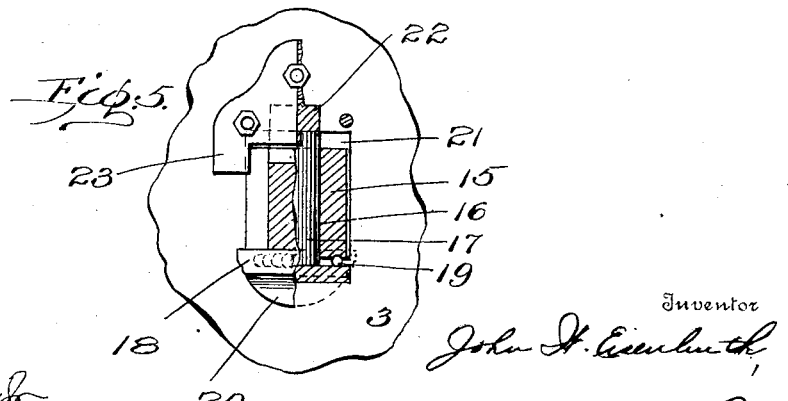

UNITED STATES PATENT OFFICE.

JOHN W. EISENHUTH, OF BROOKLYN, NEW YORK, ASSIGNOR TO THE EISENHUTH HORSELESS VEHICLE CO., A CORPORATION OF MAINE.

STEERING DEVICE FOR MOTOR-VEHICLES.

No. 805,274.     Specification of Letters Patent.     Patented Nov. 21, 1905.

Application filed May 25, 1905. Serial No. 262,303.

*To all whom it may concern:*

Be it known that I, JOHN W. EISENHUTH, a citizen of the United States, residing at Brooklyn, in the county of Kings and State of New York, have invented certain new and useful Improvements in Steering Devices for Motor-Vehicles; and I do hereby declare the following to be a full, clear, and exact description of the invention, such as will enable others skilled in the art to which it appertains to make and use the same.

My invention relates to improvements in running-gear for motor-vehicles, and has particular reference to means for guiding the same.

It consists in a suitable frame adapted to be mounted upon wheels, the said frame having an axle carrying guiding-wheels. The guiding-wheels are pivotally secured to the ends of the axle so that they may be turned one way or the other to direct the vehicle.

It also consists in means for moving the guiding-wheels simultaneously, said means consisting of yokes connected with the wheels, a lever connected with the yokes, and a gearing for moving the lever.

It also consists in means for supporting the frame upon the guiding-wheels, said means comprising yokes which are attached to an axle of the frame and are provided with pivotally-attaching means for engaging the non-revoluble central portion of the guiding-wheels.

It also consists in certain novel constructions, combinations, and arrangements of parts, as will be hereinafter fully described and claimed.

In the accompanying drawings, Figure 1 represents a top plan view of a portion of the running-gear, showing a guiding means mounted thereon. Fig. 2 represents a vertical cross-section through the running-gear looking toward the guiding-wheels. Fig. 3 represents a vertical longitudinal section of a portion of the said running-gear, the inner surface of one of the guiding-wheels being shown in side elevation. Fig. 4 represents a detail sectional view through a portion of one of the guiding-wheels, illustrating the means of pivotally connecting the axle-yoke to the same; and Fig. 5 is a detail view, partially in section and partially in elevation, of the same.

1 in the drawings represents a frame forming part of a running-gear 2, and the axle secured thereto; 3 3, guiding-wheels pivoted upon the end of said axle, and 4 represents an actuating-lever mounted upon the running-gear.

My improved running-gear is designed for use with wheels which have a central non-revoluble web portion and a peripheral revoluble rim portion. In this class of running-gear the axle of the guiding-wheels does not turn upon a central pivotal pin or king-bolt, but is rigidly secured to the frame of the running-gear. While these wheels may be constructed in any suitable manner, I preferably form them in the manner described and claimed by me in an application for a patent applied for upon even date herewith. As seen in the drawings, the frame 1 is constructed preferably of tubing for the purpose of strength and lightness and is so shaped as to permit the wheels 3 3 to turn sufficiently as to guide the vehicle. The shaft 2 is rigidly secured to the end of the framing 1 and projects beyond the same at each end, where it is provided with axle-yokes, as 5 5. The yokes 5 are pivotally connected with the wheels 3 3, so that the said wheels may be turned from side to side, as will be hereinafter more fully described. Horizontal yokes, as 6 6, are also secured to the central non-revoluble web portion of the guiding-wheels, being riveted or bolted thereto. Each of the yokes 6 6 is provided with an extending arm 7 7, and the said arms are connected, by means of crossing rods 8 8, with the ends of the actuating-lever 4. The lever 4 is preferably pivoted upon the central bar of the frame 1, as at 9.

A segmental rack 10 is secured to the lever 4 and is adapted to be engaged by a pinion 11, rigidly secured to the lower end of a steering-shaft 12. The steering-shaft 12 is made extending upwardly through the bottom of the vehicle and to a point within easy reach of a person operating the same. In order to insure the easy operation of the lever and its rack, I mount a bracket 13 upon the frame 1 and pivot in the said bracket two or more flanged antifrictional rollers 14 14. The rollers 14 14 engage the outer edge of the segmental rack 10, so as to smoothly guide the same in its movements. It will be apparent that by turning the shaft 12 motion will be imparted to the lever 4 through the pinion-rack and will be caused to move the yokes 6 6 through the connecting-rods 8 8, so as to direct the guiding-wheels.

The axle-yokes 5 are preferably arranged in a vertical plane, the upper and lower ends of each yoke having a head 15 formed thereon and a vertical bearing in each head. The vertical bearings 16 16 are adapted to engage vertical pivot pins or bolts, as 17 17. These pivot pins or bolts are formed with flanged bases, as 18, upon which the heads 17 rest, ball-bearings, as 19, being preferably interposed between the two. The bases 18 are also provided with downwardly-extending vertical flanges, which embrace the web portions of the wheels when in their proper position. The heads and pivots of the yokes 5 are adapted to extend into suitable openings, as 21, formed in the web portions of the wheels. These openings 21 are rectangular in shape and provided with upper extensions in their upper edges, as at 22. When the yokes are to be attached to the web portions of the wheels, the pivot-pins 17 are inserted in the bearings 16 and the heads and pivot-pins are inserted in the openings 21. The said openings are sufficiently elongated to permit the heads to be raised far enough to place the flanges 20 so as to embrace the web portion of the wheel, as is clearly seen in Fig. 4 of the drawings. The upper extension 22 22 of the openings 21 permit the insertion of the upper extended portion of each of the pivot-pins 17. When the pivot-pins and heads have been inserted in the apertures, they are depressed so that the bases 18 rest upon the lower edges of the openings 21, the downwardly-extending projections 20 extending on each side of the web of the wheel, and thereby firmly holding the pivots in position at that point. In order to firmly secure the upper ends of the pivots in place, plates, as 23 23, are in place upon each face of the wheel, so as to inclose the upper end of the pivots 17 and hold them firmly in the rests 22.

It will be seen that by this construction the ends of the axle are strongly secured to the web portions of the guiding-wheels, and yet said wheels can be turned easily in guiding the vehicle. The yokes 5 can be made sufficiently wide to exert a strong leverage upon the web portions of the wheels, while, on the other hand, the yokes 6 have a strong leverage upon the wheels for turning them under the influence of the guiding mechanism.

From the above description it will be evident that I am enabled to produce a running-gear and guiding mechanism for vehicles which is very simple and yet which is strong and effective in guiding the said vehicle.

Having now described my invention, what I claim as new, and desire to secure by Letters Patent, is—

1. A running-gear for vehicles comprising a suitable frame, guiding-wheels pivotally secured thereon having comparatively large non-revoluble web portions, yokes rigidly secured directly to the said webs, and means for moving the said yokes for moving the wheels in one direction or the other for directing the movements of the vehicle, the yoke affording a strong leverage on said wheels, substantially as described.

2. A running-gear for vehicles comprising a frame and a shaft carried thereby, wheels pivoted on the said shafts and provided with comparatively large non-revoluble web portions yokes rigidly secured directly to the said webs, a lever connected with the said yokes, and means for moving the lever in order to actuate the yokes and thereby guide the movements of the running-gear, the yokes providing a strong purchase on said wheels substantially as described.

3. In a running-gear for vehicles, the combination with a suitable frame, of a fixed shaft carried thereby, guiding-wheels pivoted to the ends of the said shaft, yokes secured to the inner surface of the said wheels, a lever pivoted upon the frame and having its ends connected with the yokes of the guiding-wheels, a rack secured to the said lever, a pinion adapted to engage the said rack and provided with suitable hand-operating mechanism whereby the lever may be actuated to move the guiding-wheels one way or the other, substantially as described.

4. In a running-gear for vehicles the combination with a suitable frame, of an axle carried thereby, wheels pivoted to the said axle, yokes secured to the wheels and having inwardly-projecting arms, a lever pivoted upon the frame of the running-gear, rods connecting the ends of the lever with the arms of the yokes upon the opposite sides of the said running-gear, the said rods crossing each other, a segmental yoke secured to the said lever having internally-arranged rack-teeth formed thereon, a pinion for engaging the said rack-teeth and thereby controlling the movement of the guide-wheels, an antifriction-guide engaging the periphery of the said segment comprising flanged antifriction-rollers, and a bracket for holding the same in position, substantially as described.

5. In a running-gear for vehicles, the combination with a suitable frame, of wheels having non-revoluble web portions, an axle carried thereby, yokes rigidly secured to the ends of the said axle, means for pivotally connecting the arms of said yokes directly to the central web portions of the wheels whereby the wheels may be permitted to turn one way or the other to guide the running-gear, while at the same time a good leverage is obtained on the web for holding the wheel vertical, and means connected with the said wheels for guiding them, substantially as described.

6. In a running-gear for vehicles, the combination with a suitable frame, of a fixed shaft carried thereby, wheels having non-revoluble web portions, rigid yokes formed upon the ends of the said shaft, pivot-pins carried by each arm of the said yokes and engaging apertures formed in the web portions of the guiding-wheels, the web portions of the guiding-wheels being thus pivoted upon said yokes, and means for turning the said guiding-wheels upon the said pivots, the construction being such that a strong leverage is obtained for holding the wheels vertical, substantially as described.

7. In a running-gear for motor-vehicles the combination with a suitable frame, of an affixed shaft mounted thereon, vertically-arranged yokes secured to the ends of the said shaft, wheels having non-revoluble web portions and revoluble rim portions, heads formed upon the ends of the said yokes having vertical bearings formed therein, pivot-pins adapted to be inserted in the said bearings, the said heads to the said pivot-pins being adapted to extend into apertures formed in the web portions of the guiding-wheels, and a means for holding the said pivot-pins in the said apertures, substantially as described.

8. In a running-gear for vehicles the combination with a suitable frame, of a shaft mounted thereon, wheel-engaging yokes secured to the ends of the said shaft, guiding-wheels secured to the said shaft having non-revoluble web portions and revoluble rim portions, means for pivotally connecting the said web portions to the said yokes comprising heads formed upon the ends of the said yokes having vertical bearings formed therein, pivot-pins adapted to engage the said bearings, bases supporting the said pivot-pins, depending flanges formed upon the said bases for embracing the web portions of the guiding-wheels, the said web portions of the guiding-wheels having elongated openings for receiving the heads of the yokes and their pivot-pins, plates for locking the said pivot-pins in the said apertures, some of said plates having spacing-blocks adapted to fill the aperture above the said pivot-pins whereby the parts are securely held in position, the construction being such that the web portions of the wheels may turn upon the yokes, and a means for turning the said wheels for guiding said running-gear, substantially as described.

9. In a running-gear for vehicles, the combination with a suitable frame, of a shaft mounted thereon, guiding-wheels secured to the said shaft having comparatively large non-revoluble web portions and revoluble rim portions, vertical yokes rigid on the said shaft and pivotally secured directly to the said webs, horizontal yokes rigidly secured to said webs for connecting the said wheels with a steering mechanism, and means for actuating the said horizontal yokes whereby the running-gear may be guided in its movements, the yokes affording powerful leverage for holding and guiding the said wheels, substantially as described.

In testimony whereof I affix my signature in presence of two witnesses.

JOHN W. EISENHUTH.

Witnesses:
   JOHN L. FLETCHER,
   RUTH J. MITCHELL.